United States Patent

Perrella

[15] 3,682,562
[45] Aug. 8, 1972

[54] PRECISION DRILL PRESS
[72] Inventor: Guido Perrella, 205 Edgehill Road, Westmount, Quebec, Canada
[22] Filed: Dec. 10, 1969
[21] Appl. No.: 883,875

[52] U.S. Cl. ................. 408/234, 308/3 A, 308/6 B
[51] Int. Cl. ............................................. B23b 47/00
[58] Field of Search ................. 77/1, 5; 308/3 A, 6 B; 408/234

[56] References Cited

UNITED STATES PATENTS

| | | | |
|---|---|---|---|
| 2,356,641 | 8/1944 | Wolfe | 308/3 A |
| 3,263,530 | 8/1966 | Pleger et al. | 77/1 |
| 3,059,979 | 10/1962 | Hohl et al. | 408/234 X |

*Primary Examiner*—Francis S. Husar
*Attorney*—Cushman, Darby & Cushman

[57] ABSTRACT

The invention describes apparatus for providing guided motion of a machine tool along a predetermined and substantially linear path. In a preferred embodiment, the head of a drill press is manufactured as a casting having a chamber with oppositely disposed guiding surfaces machined therein to be exactly parallel to the axis of the main column of the drill press. A mounting head or quill unit is mounted for reciprocal motion in this chamber, and also has machined guiding surfaces thereon for cooperating with the corresponding surfaces in the chamber of the drill press head. Needle bearings are preferably used to mount the quill unit for reciprocal motion. Guide rods for the machine tool are movably supported on the mounting head, and these guide rods also have machined bearing surfaces for cooperating with needle bearings in which they are mounted thus accommodating reciprocal movement thereof for disabling substantially any lateral movement of the tip of the machine tool. The mounting head or quill unit and the guide rods mounted therein are preferably of rectangular cross-section.

8 Claims, 4 Drawing Figures

FIG.3

PRECISION DRILL PRESS

This invention relates to apparatus for providing guided motion of a machine tool such as a drill bit along a predetermined and substantially linear path. More particularly, the present invention provides an improved mounting head or quill unit for use in a drill press.

It has long been recognized that in a lower priced drill press of the type usually found in most machine shops, use of such equipment to drill or machine very accurately located holes in practically impossible. Prior art drill presses of the type previously mentioned simply do not provide adequate structure necessary for enabling a drill chuck, for instance, to be rotatably mounted in the head of a drill press in such a way as to minimize the lateral movement or "play" of either the chuck and/or machine tool held thereby. Accordingly, as soon as the prior art drill press is operated, lateral movement or "play" of the drill chuck and machine tool mounted therein accompanies rotation of the same. This lateral movement or "play" is frequently in order of ±0.010 inches. In some previous attempts to overcome this disadvantage of excessive "play," and to enable drilling or machining of holes very accurately, various types of jig boring equipment was developed. It will be recognized, however, that as the capability for drilling or machining holes to greater and greater degrees of accuracy increased, so too did the cost of the particular piece of prior art equipment. The present situation therefore arose, that although there are jig borers and drill presses available today which provide high accuracy, such machinery is also so extremely expensive as to be simply prohibitive in cost and therefore uneconomical for most machine shops. Indeed, in many instances it is simply not practical for many machine shops to be provided with one or preferably more of these accurate machines. Accordingly, in today's modern technology where demands for high accuracy and low operating costs are continually being sought, it is highly desirable to have a relatively inexpensive piece of machine shop equipment which can nevertheless enable highly accurate work to be done, especially in most conventional machine shops.

It is therefore an object of this invention to provide an improved mounting head or quill unit for use preferably in a drill press such that significantly improved accuracy can be obtained without a prohibitive increase in costs.

It is another object of this invention to provide an improved mounting head which is relatively straightforward to manufacture and yet enables accurate work to be carried out reliably, using this mounting head. The present invention provides apparatus which can be manufactured and sold at moderate prices, and which can readily be maintained in good operating condition for consistently enabling highly accurate work to be carried out.

These and other objects and features of the present invention will become apparent from a reading of the detailed description below. In a broad sense, however, the invention contemplates apparatus for providing reciprocal motion of a machine tool along a predetermined and substantially linear path, comprising a mounting head adapted to rotatably support a drill chuck or the like, being multi-sided in cross-section and movably mounted in a machine housing, with said mounting head including machined guiding surfaces on opposite sides exteriorly thereof for cooperating with corresponding guiding surfaces provided on the machine housing; an aperture in the mounting head extending from one to another end thereof and having an axis parallel to said path, with two oppositely disposed bearing surfaces being provided on the periphery of said aperture; guide means for the machine tool being movably supported within said aperture and also having bearing surfaces thereon, said guide means being operable for disabling movement of the tip of the machine tool laterally of said predetermined path; and roller bearing means so mounted as to be engageable with the guiding, and bearing surfaces, in order to coact with the same for limiting the mounting head and guide means to movement parallel to said path, and said machine tool to movement along said path.

Certain modifications and refinements can be made to such apparatus within the spirit of this invention. Accordingly, the guide means for the machine tool can be movable independently of the mounting head or quill unit; and these guide means will preferably be spring biased to a position outwardly from the mounting head, such that the guide means will normally be urged into an operative position engaging work piece at all times, especially when the machine tool first contacts the same. The following detailed description will be better understood with reference to the accompanying illustrative drawings, in which:

FIG. 1 1 is a side elevation view, taken partly in section, and showing a preferred embodiment of the present invention;

Figure 1:
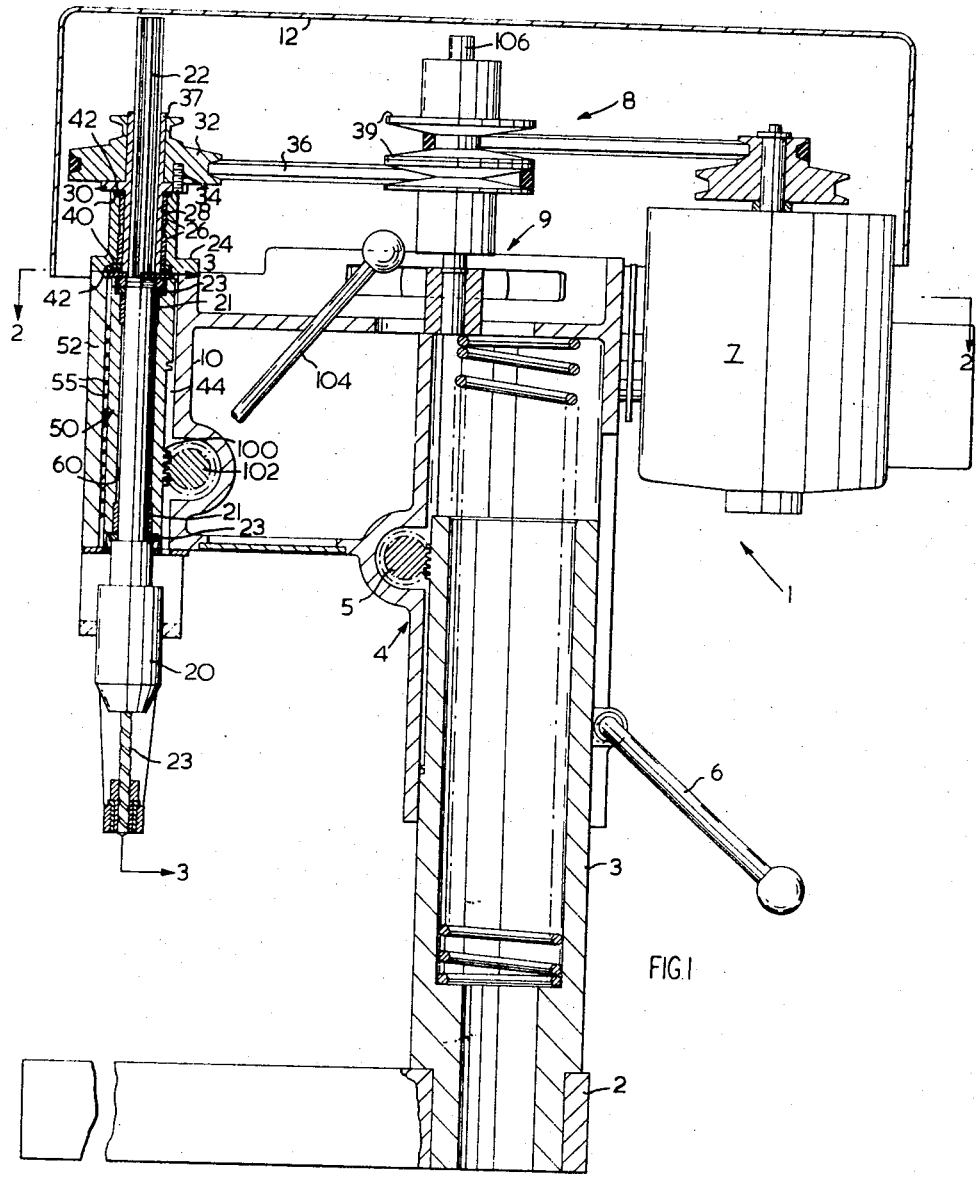

Turning now to the drawings wherein like numerals represent the same part, the drill press overall is shown at 1. This particular drill press 1 generally comprises a work stand or base 2, to which a main supporting column or post 3 is fixedly attached. A drill press body 4 is so mounted on the upper portion of the main supporting column 3 as to be movable both axially of the column, and rotatably about the same. The drill press body 4 can be vertically positioned by means of a rack and pinion arrangement 5 and locked in position by a cammed lever 6. It will be recognized, of course, that other alternative arrangements that are well known in this art can also be used. It will also be recognized that the drill press 1 is normally provided with a driving motor 7, associated drive belts and pulleys shown generally at 8, and in the particular embodiment of FIG. 1, structure shown generally at 9 which provides a variable speed capability to the drill press 1.

The drill press body 4 is usually manufactured from a ferrous material by casting techniques that are well known in the art, and is provided with a drill press head indicated at 10. A drill press housing 12 which is usually formed of sheet metal or the like, serves to enclose the driving motor 7 and associated drive belts and pulleys 8, and so on, which are normally mounted in the upper part of the drill press body 4. This drill press housing 12 is usually hingedly mounted on the drill press body 4, as indicated at 14, and is usually maintained in a closed condition either by ratchet arrangements, fastening screws, or other such conventional fastening means.

Figure 3:
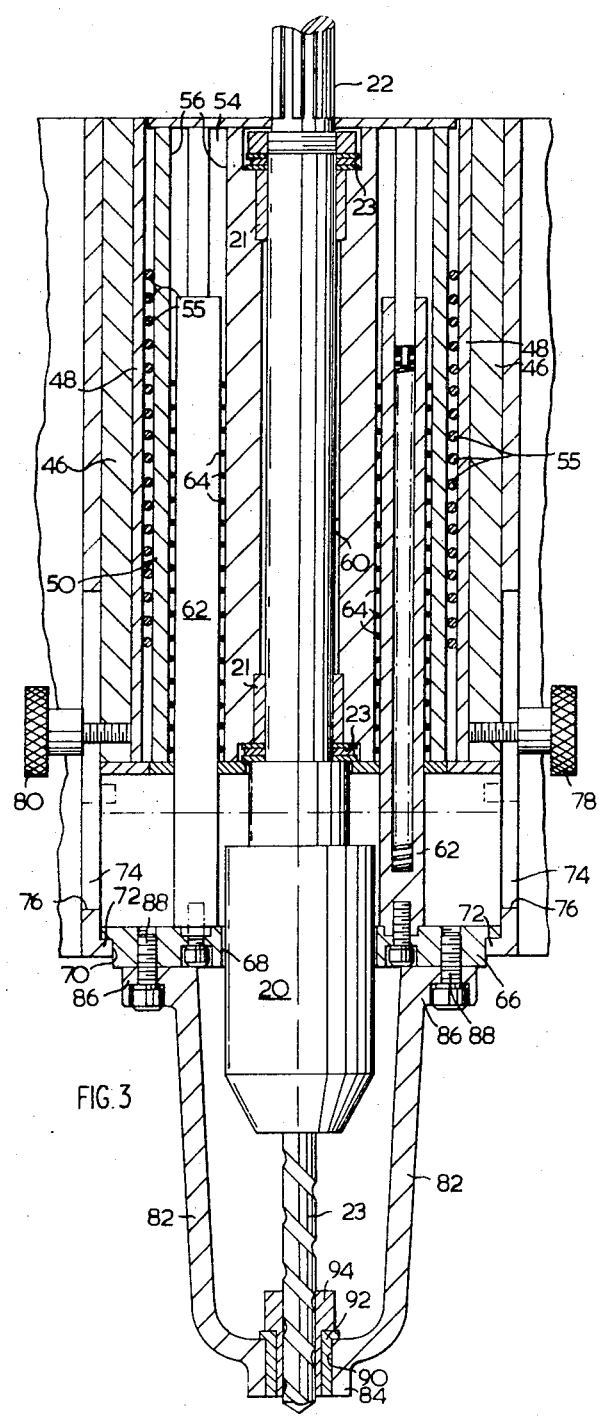
FIG. 3 is a side elevation view taken in section generally centrally of the mounting head or quill unit of FIG. 1; and FIG. is a fragmentary side elevation view, taken in section, and showing part of the structure which affords a variable speed capability to the drill press of FIG. 1.

As may best be seen in FIGS. 1 and 3 a drill chuck 20 is shown rotatably mounted within a quill unit or mounting head 50. This mounting head or quill unit 50 is itself movably mounted in the drill press head 10, as will be further described below.

As may best be seen again in FIGS. 1 and 3, the drill chuck 20 is operatively connected by means of splined connection to a drive spindle 22, and removably supports a drill bit 23. Moreover, the drill chuck 20 is rotatably supported within a central aperture 60 in the mounting head 50, and is supported by spaced apart bearings 21 that are positioned in enlarged end sections of the central aperture 60. These bearings 21 will usually be roller bearings, a sleeve-like journal bearing or other suitable equivalent. Some sealing gaskets 23 are associated with the bearings 21, and although not shown, grease nipples or oil holes will also be provided to enable adequate lubrication of the bearings 21. The drill chuck 20 and drive spindle 22 assembly is supported on the drill press head 10 by means of a mounting collar 24, best seen in FIG. 1. This mounting collar 24 will normally be circular in cross-section and is secured to the drill press head 10 by means of suitable screws, bolts or other such fasteners. In order to rotatably support the drive spindle 22 within the mounting collar 24, bearings 26 are provided adjacent either of the recessed ends 40 of the mounting collar 24. As in the previous case, these bearings 26 can be roller or needle bearings, or a sleeve-like journal bearing, or other such equivalent. These bearings 26 are mounted to surround one end of a tubular mounting sleeve 28 that has a radially extending flange 30 provided generally centrally axially thereof. A drive pulley 32 is secured to this flange 30 and is locked thereto by means of a threaded pin 34 so that the pulley and mounting sleeve 28 rotate as a single unit. This drive pulley 32 is held in a position abutting against the flange 30 by means of a locking circlip 37, and is in operative, driven engagement with a driving belt 36 which is itself connected through the variable speed means 9, including variable diameter pulleys 39 to the main driving motor 7. As previously noted, the two ends 40 of the mounting collar 24 are recessed, and contain lubricating seals or gaskets 42. Additionally, suitable grease nipples or oil holes will again be provided in the mounting collar 24 for adequately lubricating the rotatable mounting sleeve 28 and bearings 26.

The drill press body 4 and head 10 are usually manufactured by casting, with the head 10 being provided with a chamber 44 that is adapted to house and movably support the quill unit or mounting head 50. This can clearly be seen in FIG. 2. This chamber 44 is provided with a number of raised and/or recessed surfaces 46 and 47 which are carefully machined after manufacture of the drill press body 4 in order to provide guiding surfaces which are perfectly parallel to the axis of the main supporting column 3. If desired, shim-like spacers 48 that have also been carefully machined to have opposite sides exactly parallel to one another can be attached to the surfaces 46 and 47 to enable precisely locating the mounting head 50 within the chamber 44. A face plate 52 serves to retain the mounting head or quill unit 50 in place in the chamber 44, and is removably connected to the side walls of the chamber by means of bolts, screws or other such fasteners.

Figure 2:
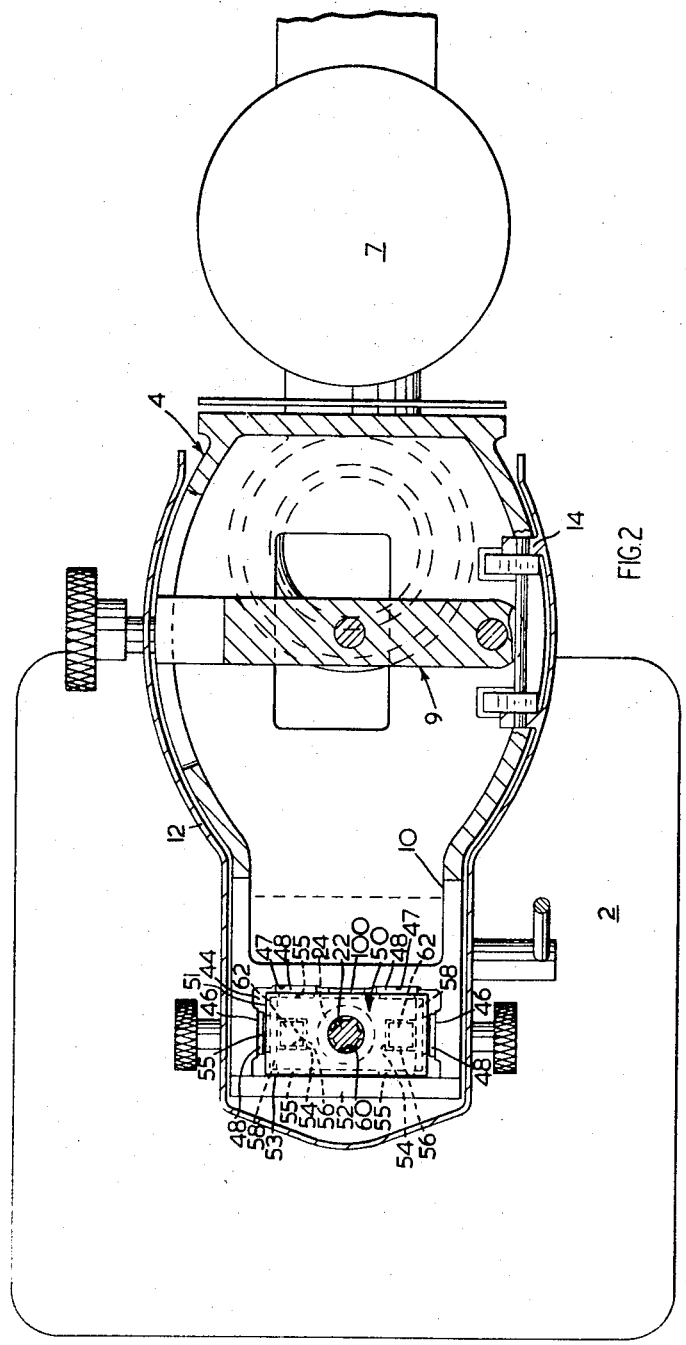
FIG. 2 is a plan view taken in section along line 2—2 of FIG. 1, and showing an improved mounting head or quill unit of the type contemplated herein.

The mounting head or quill unit 50 shown in FIGS. 2 and 3 comprises a block of steel which has been machined on its exterior surfaces to a shape which, in this particular embodiment, is rectangular in crosssection. Accordingly, the mounting head 50 has opposite short sides 51 and long sides 53 that are perfectly parallel to one another. FIG. 2 shows the short sides 51 being machined to provide recesses 54 that define guiding or bearing surfaces 56 which are perfectly parallel to one another and to the outer sides 51 and 53 of quill unit 50. The quill unit or mounting head 50 is also provided with the central aperture 60 which, as previously described, is adapted to rotatably support the drill chuck 20. The open side of each of the recesses 54 is closed off by means of a face plate 58 which will be carefully machined on at least one side thereof, and which is removably fastened to the quill unit 50 by screws, bolts or the like.

A plurality of bearings 55 which are preferably needle bearings, are provided in suitable races which can be mounted with the quill unit or mounting head 50 inside of the chamber 44. The needly bearings 55 will engage the carefully machined surfaces 46 and 47 or the shim-like spacers 48 attached thereto, if applicable, and will enable the quill unit 50 to be moved reciprocally up and down as seen in FIG. 1. This reciprocal motion is substantially linear and, in practice, has been so accurate as to limit lateral deviations to about ±0.001 inches. It has also been found that use of needle bearings which are commercially available has been adequate, since the very precise and accurately guided movement is limited by the machined guiding surfaces provided in the chamber 44 of the drill press head 10. Accordingly, by limiting the areas where accurate machining of guiding surfaces is to be done, manufacturing costs can be reduced without sacrificing accuracy. Moreover, although no large bearing loads are applied to the needle bearings 55, there will be some wearing encountered. When that happens, it is a simple matter to purchase a corresponding replacement set of bearings and substitute them for the worn needle bearings. It is also to be recognized that under such conditions, not only is the replacement of worn needle bearings a simple and inexpensive procedure, but most importantly, the "downtime" of the drill press itself can be minimized. This is of course an important consideration in the efficient and economical operation of a machine shop.

With particular reference to FIG. 3, it can be seen that a pair of interconnected guide rods 62 which are movably mounted within the recesses 54 on quill unit 50, serve to provide guidance and support for the tip of the drill bit 23. These guide rods 62 are reciprocally movable within the recesses 54, and are guided therein by a plurality of needle bearings 64 which are mounted in a sleeve-like tubular race which surrounds each of the guide rods. It will be recognized that at least a pair of oppositely disposed exterior faces on the guide rods 62 are carefully machined so that these surfaces together with the surfaces 56 in the recesses are engaged by the needle bearings 64 to provide the accurately guided movement. As in the previous case, a minimum of highly accurate machining can be provided and combined with commercially available needle bearings (the bearings 64) to once again provide support and guidance along a considerable extent of the length of each guide rod 62, thereby maintaining lateral deviation of the vertically reciprocally movable guide rod 62 as low as possible. As seen particularly in FIG. 3, corresponding ends of each guide rod 62 are fixedly attached to a mounting plate or disc 66. The disc 66 is provided with a central aperture 68 which is of a diameter sufficient to allow the drill chuck 20 to be moved therethrough without binding. The peripheral edge of this disc 66 is provided with a shoulder 70 which is engaged by lugs 72 provided on the outer ends of a pair of support bars 74. These support bars 74 are provided with longitudinal, elongated slots 76 which cooperate with locating pins 78 and 80 that either threaded or spring loaded to effect releasably locking the support bars 74 in a preselected position relative to quill unit 50. Springs 62' bias rods 62 outwardly of quill unit 50.

The supporting plate or disc 66 also serves to support a one piece fork-shaped unit having legs 82 and a central bight portion 90. Each of the legs 82 has an outwardly extending flange 86 which is bored and threaded to receive fastening means 88 that connects the same to the supporting disc 66. As seen in the drawing, the bight portion 84 is provided with a central aperture 90 which is adapted to closely receive a guide bushing 92 therein. A tubular sleeve bearing 94 is also provided interiorly of the guide bushing 92 in order to closely receive the tip of the drill bit 23 and still allow rotation of the same. Although not shown, suitable oil holes will also be provided for lubrication of the tip of the drill bit 23.

Figure 4:
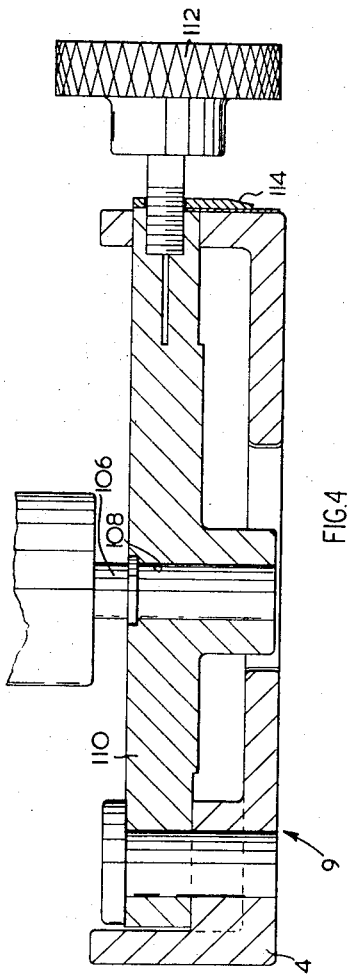

The mounting head or quill unit 50 is provided with a rack 100 on one of its long sides, centrally thereof in order to be engaged by a cooperating pinion gear 102 which is rotatably mounted in the drill press head 10, as shown in FIG. 1. This pinion gear 102 is connected to a shaft which can be rotated by manually manipulating a lever 104 that causes the quill unit 50 to be moved reciprocally up and down relative to the drill press body 4. The exact construction and operation of the pinion gear 102, the shaft on which it is mounted in the drill press head 10, and the manipulating handle 104 are known to those familiar with this art, and hence a more detailed description is believed to be unnecessary. It is also to be noted that the variable speed means 9 is also known to those skilled in this art. FIG. 4 does, however, illustrate some of its construction features. Accordingly, the variable diameter pulleys 39 of FIG. 1 are supported on a central shaft 106, with one end thereof extending into an opening 108 in an actuating lever 110. This actuating lever 110 is pivotally mounted at one end thereof to the drill press body 4, and has a handle or knob 112 and an indicating pointer 114 attached to its other end. Pivoting of lever 110 laterally will enlargen one, and decrease the other diameter of the two pulleys 39 to cause a corresponding change in the speed at which the drive spindle 22 and drill chuck 20 are driven. The pointer 114 cooperates with a suitable scale, seen at 116, which is marked to provide a clear indication of the particular drill chuck speed which is available at a selected position of the actuating lever 110. The present variable speed means 9 enables an automatic change in the drill chuck speed to be effected within a range of speeds dependent upon the minimum and maximum speeds which can be obtained using a particular driving motor 7, and drive belts and pulleys 8 of any given size. Other ways for enabling a change in the speed at which the drill chuck 20 is to be driven can also be used, as will be familiar to those skilled in this art.

It will therefore be recognized from the preceding description that although commercially available bearings are used to facilitate the reciprocal and guided movement of the mounting head or quill unit 50 and of the guide rods 62, these bearings provide support and guidance along a considerable extend of each of the quill unit 50 and guide rods 62. Because the guiding or bearing surfaces on which the needle bearings 55 and 64 ride have been accurately machined to be exactly parallel or at least as nearly so as it is possible to be, to the axis of the main supporting column 3, maximum accuracy in guiding the drill bit 23 can be achieved with a minimum of expense involved in the machining operations. In other words, the areas where accurate machining of the drill press head 10 is required can be minimized according to the present structure, and although commercially available needle bearings can be used satisfactorily, no loss in accuracy is encountered. Indeed, a very significant improvement in the degree of accuracy available using the arrangement previously described can be obtained. The quill unit 50 and guide rod 62 are both rectangular in cross-section. And as it will be recognized by those in this art, such a configuration is perhaps the easiest to machine for providing guiding surfaces that are exactly parallel. It will be recognized, however, that other cross-sectional shapes can also be used, and that so long as the guiding surfaces are carefully machined to be parallel to the axis of the main supporting column 3, accurate control and a very significant reduction in the lateral "play" of the drill bit 23 could be obtainable. According to such an arrangement, therefore, the quill unit or mounting head and guide rods for the drill bit are limited to movement parallel to a predetermined path, parallel to the main axis of the drill press; while the drill bit is itself limited to reciprocal movement along said path. Moreover, the drill tip bushing associated with the guide rods provides support for the drill tip just as the tip makes contact with a workpiece. That is a particularly important time to provide accurate guidance and support, since any deviation likely to occur, will occur at that time.

It will be apparent to those skilled in this art that various modifications and changes to the specific arrangements described herein could be made. It is therefore intended that all such changes and modifications as would be obvious to those skilled in this art are intended to be comprehended within the spirit of this invention, as defined in the claims below.

The embodiments of the invention in which an exclusive property or privilege is claimed are defined as follows:

1. Apparatus for providing reciprocal motion of a tool such as a drill bit along a predetermined linear path, comprising: a non-rotating mounting head supported by said apparatus for linear movement along said path, the mounting head being operable for receiving and rotatably supporting one end of a shaft, on the other end of which shaft said tool is carried, the mounting head having at least one aperture therein with an axis, when in use, disposed parallel to said predetermined path, with machined bearing surfaces being provided on the periphery of each aperture; non-rotatable guide means for inhibiting movement of the tool laterally of said predetermined path, said guide means including a first guide portion disposed externally of said mounting head for cooperating with the tool, and a second guide portion guidedly received within said aperture and having machined bearing surfaces thereon; said bearing surfaces being operative for limiting said guide means to movement substantially parallel to said linear path.

2. The apparatus of claim 1, wherein roller bearing means are provided in the aperture in operative relation to said bearing surfaces.

3. The apparatus of claim 2 wherein said roller bearing means comprise needle bearings mounted in mounting sleeves which are disposed in said aperture.

4. The apparatus of claim 1 wherein the cross sectional shape of said second guide portion of said guide means in a plane transverse to said predetermined path is rectangular.

5. Apparatus adapted to be mounted in a drill press housing for providing reciprocal motion to a rotatable machine tool such as a drill bit along a predetermined linear path, said apparatus comprising: a non-rotatable mounting head adapted to be mounted in the drill press housing for movement along said path, said mounting head having a bore extending along said path for receiving and rotatably supporting a drill chuck, said mounting head further having a pair of apertures each of rectangular cross section disposed on opposite sides of said bore and extending parallel thereto, said apertures each having machined bearing surfaces provided on opposite sides thereof; non-rotatable guide means for preventing movement of the tool laterally of said predetermined path, said guide means including a first guide portion spaced from said mounting head in an axial direction with respect to said bore for cooperating with the tool and a pair of second guide portions received within said apertures and having machined bearing surfaces thereon; and roller bearing means mounted between the bearing surfaces on said second guide portions and the bearing surfaces on the sides of said apertures for restraining said guide means to movement parallel to said path.

6 Apparatus as in claim 5 wherein said mounting head and guide means are independently movable.

7 Apparatus as in claim 5 wherein said guide means are extensible from said mounting head simultaneously with movement of the machine tool to an operative position engaging a workpiece.

8. Apparatus as in claim 7 including spring means biasing said guide means to an extended position relative to said mounting head in readiness to provide guided support to the tool when it first engages a workpiece.

* * * * *

UNITED STATES PATENT OFFICE
CERTIFICATE OF CORRECTION

Patent No. 3682562            Dated August 8, 1972

Inventor(s) Guido PERRELLA

It is certified that error appears in the above-identified patent and that said Letters Patent are hereby corrected as shown below:

--- Applicant claims priority of Canadian application Serial No. 064,677, filed October 10, 1969. ---

--- Assignment to DBM INDUSTRIES LIMITED dated May 19, 1972 recorded May 26, 1972 on Reel 2853, Frames 722-723. ---

Signed and sealed this 17th day of April 1973.

(SEAL)
Attest:

EDWARD M. FLETCHER, JR.          ROBERT GOTTSCHALK
Attesting Officer                  Commissioner of Patents